United States Patent [19]
Sparlin et al.

[11] 3,961,972
[45] June 8, 1976

[54] HIGH STRENGTH SILICATE FORM AND METHOD FOR PRODUCING SAME

[75] Inventors: Derry D. Sparlin; Charles M. Starks, both of Ponca City, Okla.

[73] Assignee: Continental Oil Company, Ponca City, Okla.

[22] Filed: Apr. 9, 1975

[21] Appl. No.: 566,550

[52] U.S. Cl. ................................................. 106/75
[51] Int. Cl.² ........................................... C04B 35/16
[58] Field of Search ....................................... 106/75

[56] References Cited
UNITED STATES PATENTS

| | | | |
|---|---|---|---|
| 3,741,898 | 6/1973 | Mallow et al. | 106/75 |
| 3,856,539 | 12/1974 | Mallow et al. | 106/75 |

Primary Examiner—J. Poer
Attorney, Agent, or Firm—Bayless E. Rutherford, Jr.

[57] ABSTRACT

A silicate foam composition having improved strength is produced using a particular combination of ingredients comprising an alkali metal silicate, a filler material, a cementing agent, a vinyl chloride telomer having an average molecular weight from about 600–1,000, a gelling agent, and other additives, such as a blowing agent.

17 Claims, No Drawings

HIGH STRENGTH SILICATE FORM AND METHOD FOR PRODUCING SAME

BACKGROUND OF THE INVENTION

1. Field of the Invention

This invention relates to silicate foam insulating and structural compositions. In one aspect the invention relates to an improved strength silicate foam composition. In another aspect this invention relates to a method for increasing the strength of silicate foam compositions without substantially altering the density of such foam compositions.

2. Brief Description of the Prior Art

Aqueous silicate compositions have been used extensively for specialized applications such as cements, insulation, coatings, and matrix for refractory or ablation aggregate. Silicate foam is inherently fire resistant and has excellent insulation properties. The heat transfer coefficient of silicate foam compares favorable with that of polystyrene and polyurethane foam, and silicate foam has a decomposition temperature more than five times greater than these well-known insulating foams.

A prefiling search was made on the concept of the present invention wherein the strength of a silicate foam composition is increased by the incorporation of a vinyl chloride telomer into said foam composition. No patents were located depicting the concept.

Even with extensive work in the art, prior art silicate foam compositions have not been practical because of poor water resistance, low strength, and difficulties in fabrication of a foam structure. Prior art compositions could not be practically fabricated into shapes due to composition instability and excess shrinkage. Furthermore, these compositions could not be economically applied by commercial spraying techniques due to composition instability, difficulties in controlling viscosity and poor adhesion. Thus, there have been a need and a readily available market for a versatile silicate foam composition having a combination of high strength, good water resistance, good adhesion characteristics, and acceptable fabrication characteristics.

OBJECTS OF THE INVENTION

An object of the present invention is to provide an improved silicate foam composition. Another object of the invention is to provide an improved high strength silicate foam composition. These and other objects, advantages, and features of the present invention will become apparent to those skilled in the art from a reading of the following detailed description.

SUMMARY OF THE INVENTION

According to the present invention, a silicate foam composition having improved strength is provided which comprises an alkali metal silicate, a cementing agent, a filler, a vinyl chloride telomer having an average molecular weight of from about 600 to 1,000, and a gelling agent. More specifically, the improved silicate foam composition contains from about 80 to 90 weight percent of the alkali metal silicate, from about 10 to 15 weight percent of the cementing agent, from about 1.5 to 2.5 weight percent of the filler, from about 0.5 to 1.5 weight percent of the vinyl chloride telomer, and from about 0.5 to 1.0 weight percent of the gelling agent.

Further according to the invention, a method for improving the strength of a silicate foam composition containing an alkali metal silicate, a filler, a cementing agent, and a gelling agent is provided which comprises admixing an effective amount of a vinyl chloride telomer having an average molecular weight in the range of from about 600 to 1,000 into the foam recipe prior to the addition of the gelling agent.

DETAILED DESCRIPTION OF THE INVENTION

The improved silicate foam composition of the present invention comprises a mixture of alkali metal silicate, a cementing agent, a filler, a vinyl chloride telomer having an average molecular weight ranging from about 600 to 1,000, a gelling agent, and other additives, such as a blowing agent. While the amount of each constituent can vary widely, if one is to obtain an improved strength silicate foam without a sufficient modification of the density of the foams, one preferably employs from about 80 to 90 percent of the alkali metal silicate constituent, from about 10 to 15 percent by weight of the cementing agent, from about 1.5 to 2.5 percent by weight of the filler, from about 0.5 to 1.5 weight percent of the vinyl chloride telomer, and from about 0.5 to 1 percent of the gelling agent. As is known in the preparation of silicate foam composition, a blowing agent must be employed. The amount of blowing agent can vary widely and will be dependent upon the desired consistency of the resulting foam composition. For example, when air is employed as the blowing agent in a mechanical blending process, air is passed into the mixture, while same is agitated for a desired period of time, such being determined by the amount of foaming desired. Other blowing agents can be used, such being described in detail hereinafter, but air is preferred for uniform consistency during mixing, curing, and for lower costs. Additional additives and fillers can be used as set forth herein and will be obvious to one skilled in the art in view of this disclosure.

Any water soluble silicate which cures or sets up in the presence of weakly acidic compounds such as the cementing agents and gelling agents can be employed to form the composition of the present invention. Simple water soluble silicates such as alkali metal silicate, alkaline earth metal silicates, and tertiary ammonia silicates and mixtures thereof are preferred. Sodium and potassium silicates produce silicate foams with excellent strength, water resistance, and workability with the other preferred ingredients of this invention. The silicates preferably have a silicon oxide to meta oxide molecular ratio in the range of about 1:1 to 4:1 for good solubility, workability, and curing characteristics. Lithium and any other compatible water soluble silicates can be used. Additives such as water soluble alkali metal salts and divalent metal salts can be added to modify the composition for particular properties such as chemical resistance, water resistance, color and texture.

The silicate foam compositions of this invention employ particular cementing agents, sometimes referred to as sizing agents, to produce the unique properties required. Sodium silicofluoride is preferred for ultimate strength, water resistance, and compatibility with the preferred composition. Other water soluble silicofluoride metal salts which react with silicates in an aqueous medium to produce a silicate chain or polymer can be used. These components include alkali meta silicofluoride salts, alkaline earth metal silicofluoride salts, multivalent metal salts which form insoluble silicates and amphoteric metal powders. The cementing agent may be either an acid or a compound which wil produce an acid to accelerate formation of a silicate chain or polymer which is insoluble. Certain multivalent metal salts are preferred, along with alkali metal silicofluoride such as zinc carbonate, magnesium carbonate, zinc acetate, and zinc sulfate. Certain metal oxides can also be used such as aluminum oxide, magnesium oxide, zinc oxide, and calcium oxide. Multivalent metal salts which can be used include zinc sulfate, aluminum sulfate, magnesium sulfate, and calcium carbonate. Amphoteric metal powders include aluminum, zinc, silicon, ferrosilicon, calcium silica, sodium aluminate, sodium zincate, sodium plumbate, lithium aluminum hydride, sodium boron hydride, lithium boron hydride, lithium hydride, potassium boron hydride, magnesium hydride, barium hydride, and sodium hydride. The solubility, reaction speed, and compatibility of these compounds must be determined for each composition in terms of mixing time and speed of coagulation. Some of these ingredients modify properties of the resulting foam or produce practically instantaneous reactions which makes it desirable that the mixing of the ingredients be carried out in a specific combination using modified blending and application methods. Sodium silicofluoride with the preferred composition produces an optimum blending time of about 2–3 minutes and allows sufficient mixing to produce a uniform composition with a coagulation time of about 15 minutes and a reasonable curing time. The salts of certain metals listed in Groups 2 and 3 of the periodic chart of elements are preferred. Metals such as aluminum, calcium, magnesium, zinc, and even iron from Group 8 can be used. These metals can be combined with sulfate, nitrate chloride, or oxide anions for cementing agents.

Fibrous filler is desirable in the silicate foam composition of this invention. A short glass fibrous filler is preferred which has been treated to resist the degradation in the silicate media. Fibrous filler such as glass, asbestos, cellulose fiber, other natural fiber, and synthetic fiber can be used. Particulate fillers such as sand, clay, fly ash, sulphur, perlite, talc, and vermiculite, can also be used with the silicate foam composition of this invention. These fillers can be used as a pigment or as a chemical agent such as a pesticide to impart other properties to the silicate foam. The short fiber filler improves sprayability and strength of the silicate foam while it is gelling and curing. The silicate foam composition of this invention is compatible with other fillers such as Portland cement but presents difficulties and requires certain handling techniques to avoid segregation of the silicate foam and filler. A preferred filler is chopped glass having a strand length of about 0.125-0.5 inch. Larger amounts of filler can be used than those suggested herein but are generally not economical and sometimes present handling difficulties. Certain particulate fillers such as perlite (i.e., thermal expanded alumina sulfate volcanic ash) and vermiculite (i.e., a thermally expanded mica) are excellent fillers for high strength low-shrinkage silicate foam of this composition. These improved low-shrinkage compositions are described in a copending application. These preferred silicate foam compositions also have a high K factor and excellent insulation properties with a relatively low density. Preferred perlite and vermiculite have a density of about 3–4.5 pounds per cubic foot.

The telomer product resulting from the telomerization of vinyl chloride with β-diketones and having a molecular weight in the range of from about 600–1,000 are employed in the production of the silicate foam compositions of the present invention having increased strength without a substantial change in the density of composition. The production of such telomers is set forth in copending patent application, U.S. Ser. No. 566,544, filed April 9, 1975, and entitled, 'Telomers from β-Diketones and Vinyl Chloride.' The telomers produced by the telomerization of vinyl chloride and β-diketones and having an average molecular weight in the range of from about 600–1,000, preferably 750–850, are represented by the general formula:

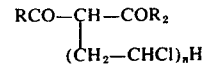

wherein R and $R_2$ can be alkyl radicals containing from 1 to about 20 carbon atoms, aromatic radicals containing 6 to 10 carbon atoms, such as phenyl and naphthyl, or alkyl substituted aromatic radicals, wherein the alkyl constituent contains from about 1 to 6 carbon atoms, and wherein the alkyl moiety is phenyl or naphthyl, and wherein n has an average value of from about 3 to about 13. As previously stated, if one is to produce the improved foam composition having improved strength without a substantial change in the density, the telomer employed must have a molecular weight of from about 60 to 1,000, preferably from 750 to 850. Examples of suitable telomers within the average molecular weight of from about 750 to 850 are

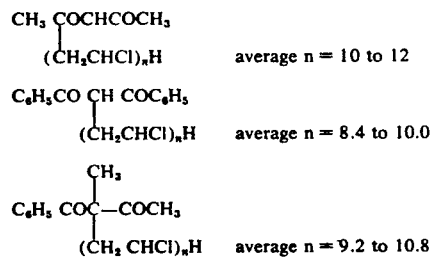

A particularly suitable telomer is one wherein n average is about 11.1 and the average molecular weight is about 796.

Another desirable ingredient for the silicate foam compositions of this invention is the gelling agent, sometimes referred to as a hardening agent. It is desirable that the gelling agent be added to the silicate foam composition after the addition of the telomer constituent. The low molecular weight amides and mixtures thereof are preferred gelling agents. These amides include acetamide, formamide, propionamide, nonamide, stearamide, benzene sulfonamide, and malonamide. Gelling agents are generally components which are weak acids or hydrolyzed in aqueous silicate solutions to produce weak acids or salts which act as weak acids. These compounds must be at least partially soluble in the gelling agent, with other agents in minor amounts. A preferred amide mixture contains about 50 percent formamide. Low molecular weight amhydrides, low molecular weight esters, and alkali metal salts can also be used as gelling agents or a supplemental gelling agent. Salts of formates, citrates, oxalates, acetates, silicilates, and similar organic ingredients can be used. Amide is an effective and inexpensive gelling agent. Organic fatty acids and other organic gelling agents hydrolyze in aqueous silicate solution at a slow rate to produce an easily handled silicate foam. Of the organic fatty acids, linoleic and oleic acid are preferred since they produce creamy white foams with relatively low shrinkage. For a maximum and minimum shrinkage, amide gelling agents are preferred. The low molecular weight organic gelling agents preferably have a molecular weight of about 50–150. These materials include first of diacetate, hexylmethylene, tetraamine, formamide, and the other organic materials listed above. Haloalcohols and trialcohols can be used as gelling agents, as well as to improve the water resistance of the silicate foam. The organic gelling agents, especially the high molecular weight ones, improve water resistance and can be applied to the silicate foam surface or last layer of the silicate foam as it is fabricated.

Aromatic haloalcohols having a 1–5 carbon haloalkylalcohol substituent can also be used.

Surfactants and other additives are optional ingredients for the silicate foam composition of this invention and can be used to modify the foam properties. For example, surfactants improve uniformity and aeration of the silicate foam while generally reducing the density. Surfactants can also be used to increase stability of the foam while it is gelling and curing. Any compatible surfactant such as soaps, detergents, fatty acid salts, and other surface active agents can be used. Preferred surfactants can be either anionic, cationic, or nonionic. A preferred class of surfactants is straight chain alcohols containing ethylene oxide (i.e., alcohol ethylene oxide adducts). Other preferred compounds include dimethylcocoamine oxide, ether sulfate, and solidum dodecylbenzene sulfate. Nonionic or anionic surfactants are preferred for a silicate foam having a smooth surface texture.

The composition of the invention can be prepared by the simplified process of this invention. The process consists of mixing, coagulation, setup and curing of the composition. Coagulation time is to be understood to be the interval of time when the foam begins to thicken up to the point where it does not flow appreciably. Setup time is the hardening phase when the foam attains strength and water resistance. The foam changes quickly from a frothy liquid or paste to a resilient gel and then gradually to a solid foam. The liquid or paste composition can be readily fabricated by known methods such as extruding, molding, or simply pouring. It can also be applied by spraying. After the composition is fabricated into insulating or structural shapes, it can be cured by any one of several methods to form a solid foam. In addition, partially or completely cured foam can be broken into aggregate which can be formed and thermally fused to produce a shaped object. For fusing foam aggregate, water in the amount of from about 1 to 15 weight percent and particle sizing are preferred for uniform foam cell structure. Microwave heating is preferred for fusing the silicate foam aggregate into a very light weight foam structure.

In one preferred process, the ingredients of the recipe for preparing the foam composition are added to a blender and agitated severely in the presence of air to allow the air to serve as the blowing agent. The mixture is agitated until the ingredients are uniformly mixed and begin to react. In preparing the foam compositions of the invention it has been found that especially desirable results are obtained wherein the vinyl chloride telomer having the desired molecular weight is incorporated into the ingredients before the addition of the gelling agent. By employing the vinyl chloride telomer having an average molecular weight of from about 600 to 1,000, preferably 750 to 850, a silicate foam composition is provided having improved strength without a substantial increase of the density of such products. Such can readily be seen upon a review of the examples set forth hereinafter.

In carrying out the process for the preparation of the improved high strength silicate foam compositions of the present invention, one can employ water soluble silicates in an aqueous form. In such case the silicate is added to at least enough water to form hydrates and allow the silicate to equilibrate prior to putting in the other ingredients, especially those which cause the silicate to set up and cure. Some ingredients such as fillers and other additives can be added to the aqueous silicate foam before the foam is prepared. For example, the filler, cementing agent and vinyl chloride telomer can all be incorporated into the aqueous silicate foam before admixing the gelling agent and the blowing agent, or when air is employed, the introduction of air into the blended mixture. A minimum quantity of water should be used for maximum strength, but sufficient water is required when employing the aqueous process to make the foam workable and to provide uniform mixing. An excess of water can be used to reduce the viscosity of the mixture. However, such excess water results in the formation of a foam composition having a reduced strength. A silicate composition can be prepared using dry or hydrated silicate water and blending the ingredients and using only enough water to wet and cement the particles together without forming a continuous aqueous phase.

When employing a dry blending process to form the foam compositions, the dry composition ingredients; namely the alkali metal silicate, the cementing agent, the filler and the vinyl chloride telomer are vented to form a substantially dry premix. The gelling agent, which is normally liquid, and, when desired, water, are then blended with the dry premix. A blowing agent, such as air, is then dispersed into the resulting mixture to allow such to prepare the desired silicate foam composition.

In order to more clearly show the unique properties of the foam compositions, and process for producing same, of the present invention, the following example is given. However, it is to be understood that the example is for illustrative purposes only and is not to be construed as limiting the invention.

Example

A. A silicate foam was prepared by admixing 415 grams sodium silicate with 70 grams of sodium silicofluoride powder cementing agent, 10 grams of fiber glass filler (½ inch chopped glass fiber) and 4 grams of a fatty acid gelling agent (i.e., Crofatol 30, a fatty acid available from Crosby Chemical Company) in a kitchen type cake mixer. The Crofatol 30 is a distilled tall oil produced by the fractional distillation of crude tall oil and contains 25–30% rosin acids. The mixture was then admixed at high speed for 2 to 3 minutes and until a creamy mixture was obtained. Thereafter, the mixture was poured into a 1-quart Mason jar, sealed, and allowed to cure for one week. At the end of the curing period a 1-inch diameter cylindrical core was cut and measurements as to density and compressive strength were made on the core sample. The compressive strength was determined using an Instrom machine. The measurement as to density and compressive strength are listed in Table I under Example A.

B. A second silicate foam composition was prepared using the same procedure and ingredients as in paragraph A with the exception that prior to the addition of the gelling agent to the mixture, 5 grams of a telomer having an average molecular weight of about 796 which was produced by the telomerization of vinyl chloride and 2,4 pentanedione was added to the reaction mixture. After the before-mentioned curing period, a 1-inch diameter cylindrical core was obtained and measurements as to density and compressive strength of this sample were made. The results of such measurements are set forth in Table I under Example B.

C. A third silicate foam composition was prepared using the same procedure and ingredients as in Paragraph B with the exception that the telomer employed had an average molecular weight of 1500. After the foam composition had cured, as previously disdussed, a 1-inch diameter cylindrical core was obtained and measurements as to density and compressive strength of the sample were made. Results of such measurements are set forth in Table I under Example C.

D. Another silicate foam composition was prepared using the same procedure and ingredients as in Paragraph B with the exception that the telogen constituent, e.g., 2-4 pentanedione, employed to produce the telomer employed were used in place of the telomer. After the curing period, a 1-inch diameter cylindrical core was obtained and measurements as to density and compressive strength of the sample were made. Results of such measurements are set forth in Table I under Example D.

TABLE I

| Example | Density (lb/ft³) | Compressive Strength psi |
|---|---|---|
| A | 34.3 | 133 |
| B | 35.1 | 237 |
| C | 44.7 | 244 |
| D | 54.3 | 257 |

The above data clearly illustrates that by incorporating a vinyl chloride telomer having an average molecular weight in the range of from about 750–850 into a silicate foam composition, one can greatly improve the strength of the foam composition with substantially altering the density of same. For example, Sample A, a control sample, had a density of 34.3 lb/ft³ and a compressive strength of 133 psi. By incorporating about 1 percent by weight of a vinyl chloride telomer having an average molecular weight of 796, the density of the foam remains substantially the same (35.1 lb/ft³) but a substantial increase in compressive strength (96 psi) was achieved. When employing a telomer having a higher average molecular weight, such as the one employed in Example C, e.g., an average molecular weight of 1,500, a substantial increase in density of the foam composition was detected. The same results were found when the telogen employed to produce the telomers was used in place of the telomer. Such is shown in the table under Example D. Therefore, the data clearly shows that one can substantially increase the strength of a foam composition without substantially altering the density of same by the incorporation of from about 0.5 to 1.5 weight percent vinyl chloride telomer having an average molecular weight ranging from about 750 to 850.

The silicate foam composition of this invention can be easily prepared and fabricated by mixing the ingredients, one or several at a time, in sequential order and foaming or aerating the mixture to produce a high-strength, essentially waterproof foam. The foam can be cast or sprayed as insulation or structural shapes can be formed by molding. The foam can also be used as a coating for concrete, urethane foam, or structural steel to provide insulation and fireproofing. The silicate foam composition has the unique combination of low density, high strength, water resistance, fire resistance, and good acoustical and thermal insulation properties. It is produced by maintaining the ingredients within the amounts specified hereinafter.

Having thus described the invention, we claim:

1. A silicate foam composition having improved strength which comprises:
   a. from about 80 to 90 weight percent of an alkali metal silicate;
   b. from about 10 to 15 weight percent of a cementing agent;
   c. from about 1.5 to 2.5 weight percent of a filler;
   d. from about 0.5 to 1.5 weight percent of a vinyl chloride telomer having an average molecular weight in the range of from about 600 to about 1,000 and represented by the generic formula:

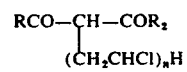

$$RCO-CH-COR_2$$
$$| \atop (CH_2CHCl)_nH$$

wherein R and R₂ are alkyl radicals containing from 1 to about 20 carbon atoms, aromatic radicals containing about 6 to 10 carbon atoms, and alkyl substituted aromatic radicals wherein the alkyl constituent contains from 1 to about 6 carbon atoms and wherein the aromatic moiety contains from about 6 to 10 carbon atoms, and n has an average value of from about 3 to 13; and
   e. from about 0.5 to 1.0 weight percent of a gelling agent.

2. The composition of Claim 1 wherein said vinyl chloride telomer has an average molecular weight of from about 750 to about 850.

3. The composition of Claim 2 wherein said telomer is

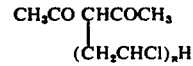

$$CH_3CO\ CHCOCH_3$$
$$| \atop (CH_2CHCl)_nH$$

wherein n average is about 11.1 and said telomer has an average molecular weight of about 796.

4. The composition of Claim 2 wherein said alkali metal silicate is selected from the group consisting of sodium silicate and potassium silicate.

5. The composition of Claim 4 wherein said cementing agent is selected from the group consisting of alkali metal silicofluoride, salts, alkaline earth metal silicofluoride salts, multivalent metal salts which form insoluble silicates and amphoteric metal powders.

6. The composition of Claim 5 wherein said cementing agent is sodium silicofluoride.

7. The composition of Claim 5 wherein said filler is a fibrous filler selected from the group consisting of glass, asbestos, and cellulose.

8. The composition of Claim 7 wherein said filler is chopped glass having a strand length of about 0.125 to 0.500 inch.

9. The composition of Claim 5 wherein said filler is a particular filler selected from the group consisting of sand, clay, fly ash, sulphur, perlite, talc, and vermiculite.

10. The composition of Claim 5 wherein said gelling agent is selected from the group consisting of low molecular weight amides, organic fatty acids, low molecular weight anhydrides, low molecular weight esters, alkali metal salts, and mixture of same.

11. The composition of Claim 10 wherein said gelling agent has a molecular weight of from about 50 to 150.

12. The composition of Claim 10 where said gelling agent is a fatty acid selected from the group consisting of linoleic acid, oleic acid, and mixtures thereof.

13. The composition of Claim 10 wherein said gelling agent is a low molecular weight amide selected from the group consisting of acetamide, formamide, propionamide, nonamide, stearamide, benzene sulfonamide, and malonamide.

14. A method for improving the strength of a silicate foam composition containing an alkali metal silicate constituent, a filler, a cementing agent and a gelling agent which comprises, incorporating into said foam composition ingredients, prior to the addition of said gelling agent, from about 0.5 to 1.5 weight percent of a vinyl chloride telomer having an average molecular weight in the range of from about 600 to about 1,000 and represented by the generic formula:

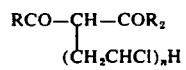

wherein R and $R_2$ are alkyl radicals containing from 1 to about 20 carbon atoms, aromatic radicals containing from about 6 to 10 carbon atoms, and alkyl substituted aromatic radicals wherein the alkyl constituent contains from 1 to about 6 carbon atoms, and wherein the aromatic moiety contains from about 6 to 10 carbon atoms, and n has an average value of from about 3 to 13.

15. The method of Claim 14 wherein said vinyl chloride telomer has an average molecular weight of from about 750 to about 850.

16. The method of Claim 14 wherein said telomer is employed in an amount of from about 0.5 to 1.5 weight percent.

17. The method of Claim 16 wherein said telomer is

wherein $n$ average is about 11.1 and said telomer has an average molecular weight of about 796.

* * * * *